(12) United States Patent
Kim et al.

(10) Patent No.: US 7,707,448 B1
(45) Date of Patent: Apr. 27, 2010

(54) DETERMINISTIC TEST STRAND UNPARKING

(75) Inventors: Han Bin Kim, Pleasanton, CA (US); Yonghee Im, Pleasanton, CA (US); Frank C. Chiu, Mountain View, CA (US)

(73) Assignee: Oracle America, Inc., Redwood Shores, CA (US)

( * ) Notice: Subject to any disclaimer, the term of this patent is extended or adjusted under 35 U.S.C. 154(b) by 544 days.

(21) Appl. No.: 11/744,052

(22) Filed: May 3, 2007

(51) Int. Cl.
*G06F 1/12* (2006.01)
*G01R 31/28* (2006.01)

(52) U.S. Cl. .................. 713/401; 713/400; 714/726; 714/729; 714/731

(58) Field of Classification Search .............. 713/400, 713/401; 714/726, 729, 731
See application file for complete search history.

(56) References Cited

U.S. PATENT DOCUMENTS

| | | | | |
|---|---|---|---|---|
| 5,905,766 A | * | 5/1999 | Nguyen | 375/354 |
| 6,055,285 A | * | 4/2000 | Alston | 375/372 |
| 6,553,435 B1 | * | 4/2003 | Normoyle et al. | 710/22 |
| 7,003,423 B1 | * | 2/2006 | Kabani et al. | 702/120 |
| 7,330,994 B2 | * | 2/2008 | Frederick | 713/600 |
| 2002/0078420 A1 | * | 6/2002 | Roth et al. | 714/798 |
| 2005/0022083 A1 | * | 1/2005 | Wu | 714/726 |
| 2005/0193299 A1 | * | 9/2005 | Saado et al. | 714/726 |
| 2006/0107145 A1 | * | 5/2006 | Athavale et al. | 714/727 |

* cited by examiner

*Primary Examiner*—Chun Cao
*Assistant Examiner*—Vincent T Tran
(74) *Attorney, Agent, or Firm*—Martine Penilla & Gencarella, LLP.

(57) ABSTRACT

A circuit for deterministic unparking of a strand of a microprocessor having multiple clock domains is described. The circuit includes a first flip-flop and a second flip-flop. Each flip-flop has a data input connected to receive a respective unpark signal, a clock signal at respective clock frequencies, and a respective enable signal. Each enable signal is generated by a respective logic block, each including a counter and each operating at a respective one of the clock frequencies. The second flip-flop has a data input connected to an output of the first flip-flop, and outputs an unpark signal that is used to unpark a strand of the microprocessor in a deterministic manner.

20 Claims, 4 Drawing Sheets

DETERMINISTIC TEST STRAND UNPARKING

CROSS-REFERENCE TO RELATED APPLICATIONS

This application is related to U.S. patent application Ser. No. 11/777,246, entitled, "Systems And Method For Transferring Data Between Different Clock Domains," filed on Jul. 12, 2007.

BACKGROUND

Testing of physical microprocessors generally involves loading a known state into the processor, e.g., through the use of internal scan chains, running the processor for a predetermined number of cycles, and then downloading the state for comparison with a state predicted by software simulation of the processor. If the actual state matches the predicted state, then the microprocessor has passed the particular test.

In modern high performance microprocessors, there is often one clock controlling internal operations and a second clock controlling interface logic with external components such as communications buses. Since two clock sources control each signal, the state of the processor as a whole cannot always be predicted with absolute certainty. This makes it very difficult to accurately determine whether a particular processor chip functions as intended.

A strand is an execution pipeline within a microprocessor core. Some processors have only one strand per core, while others may have multiple strands per core. Having multiple strands per core provides faster context switching and improved performance. When the execution engine switches from one process to another process, it may change contexts from one execution pipeline to another. When a microprocessor boots up, it is necessary that each strand be "unparked" prior to the start of execution. A "strand unpark" signal is therefore sent to the processing core. In certain multi-strand processors, the CPU is booted upon receipt of a signal from an input pin. This resulted in indeterministic behavior due to multiple clocks. For reliable testing, it is important that the strand be unparked in a deterministic manner with respect to multiple clock signals. Some mechanism is therefore needed to resolve the indeterminism in booting and testing a chip having multiple clock domains.

SUMMARY

Broadly speaking, the present invention fills these needs by providing deterministic test strand unparking.

It should be appreciated that the present invention can be implemented in numerous ways, including as a process, an apparatus, a system, a device, or a method. Several inventive embodiments of the present invention are described below.

In one embodiment, a circuit for deterministic unparking of a strand of a microprocessor having multiple clock domains is provided. The circuit includes a first flip-flop and a second flip-flop. The first flip-flop has a data input connected to receive a first unpark signal, a first clock signal, and a first enable signal. A first logic block is configured to generate the first enable signal and includes a first counter. The first enable signal is asserted based on the first counter at a frequency less than a frequency of the first clock signal. The second flip-flop has a data input connected to an output of the first flip-flop. The second flip-flop is further connected to receive a second clock signal and a second enable signal, the second clock signal being in a different clock domain of the microprocessor than the first clock signal. The second flip-flop generates a second unpark signal. A second logic block generates the second enable signal and includes a second counter. The second enable signal being asserted based on the second counter at a frequency less than the second clock signal. The second unpark signal may be used to unpark a strand of the microprocessor in a deterministic manner.

In another embodiment, a microprocessor configured for deterministic unparking of a strand of the microprocessor is provided. The microprocessor includes an interface region controlled by a first clock having a first frequency, a core region controlled by a second clock having a second frequency, and a circuit for generating a deterministic unpark signal. The circuit includes a first flip-flop and a second flip-flop. The first flip-flop has a data input connected to receive a first unpark signal, a first clock signal form the first clock, and a first enable signal. A first logic block generates the first enable signal, and includes a first counter. The first enable signal is asserted based on the counter at a frequency less than the first frequency. The second flip-flop has a data input connected to an output of the first flip-flop. In addition, the second flip-flop is connected to receive a second clock signal from the second clock and a second enable signal. The second flip-flop generates a second unpark signal. A second logic block generates the second enable signal and includes a second counter. The second enable signal is asserted based on the second counter at a frequency less than the second clock signal. The second unpark signal may be used to unpark the strand of the microprocessor in a deterministic manner.

In yet another embodiment, a method for testing a microprocessor having a CPU clock domain and an I/O clock domain is provided. In the method, an initial state into the microprocessor. A CPU clock and an I/O clock are selected so that the clock signals have a rising edge that is synchronized and wherein one of the CPU clock or the I/O clock has a frequency that is an integer multiple of the other of the CPU clock and the I/O clock, the integer multiple being equal to at least one. Control and status registers are programmed for a deterministic mode of operation of the microprocessor. Registers required to assert an unpark signal are programmed. Data and instructions are loaded into a memory coupled to the microprocessor, the instructions including a test program. An unpark register is programmed to start the test program. The microprocessor is allowed to run for a predetermined number of cycles. The microprocessor is then stopped and an ending state of the microprocessor is compared with an expected ending state.

The advantages of the present invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

In the following description, numerous specific details are set forth in order to provide a thorough understanding of the present invention. However, it will be apparent to one skilled in the art that the present invention may be practiced without some of these specific details. In other instances, well known process operations and implementation details have not been described in detail in order to avoid unnecessarily obscuring the invention.

Figure 1:
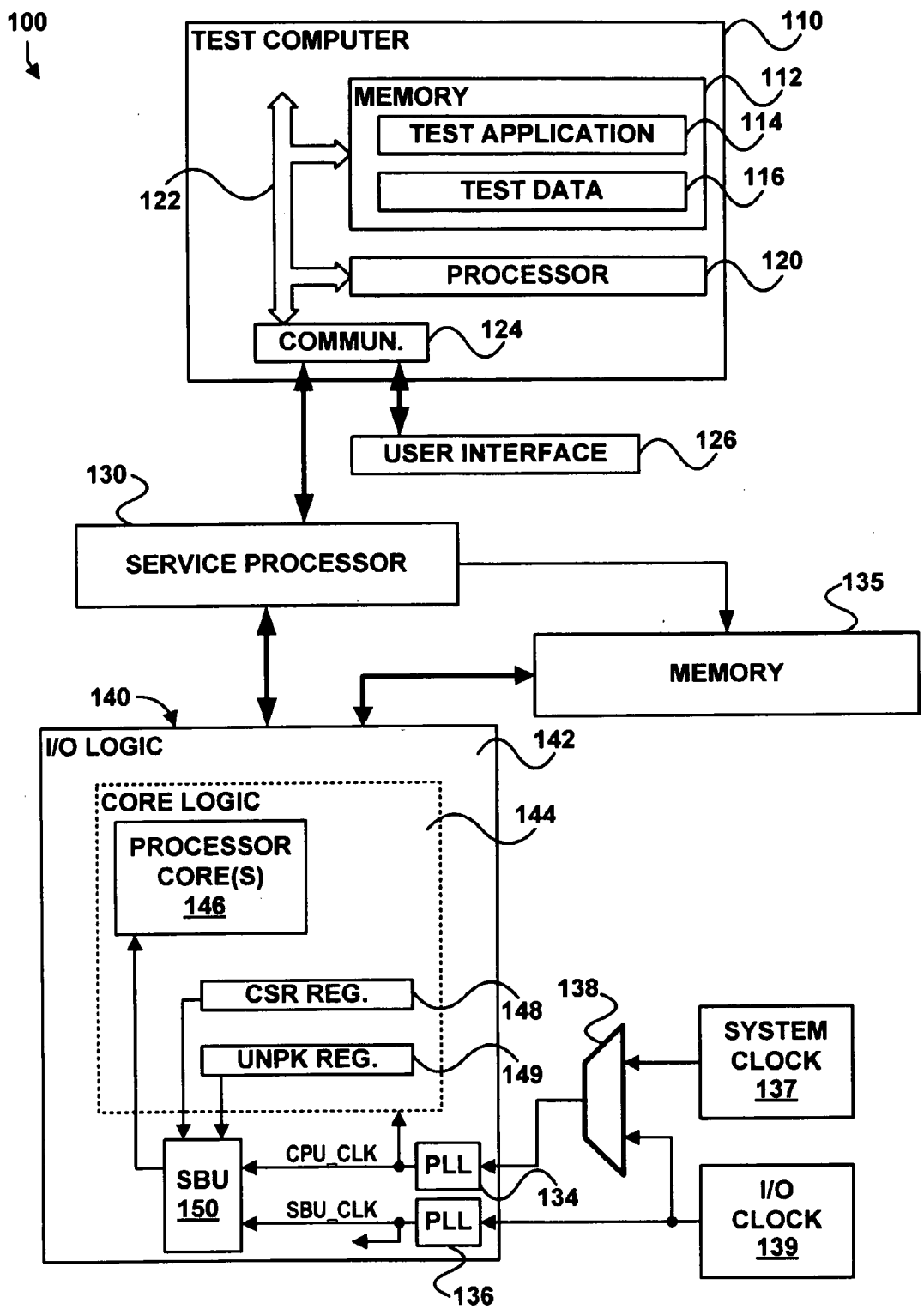
FIG. 1 presents by way of example a schematic representation of an overview of processor testing system.

FIG. 1 presents by way of example a schematic representation of an overview of processor testing system 100. A test computer 110 is used for controlling and evaluating a test of a microprocessor 140. Test computer 110 may be, for example, a general purpose computer system having a memory 112 and a processor 120 connected by communications bus 122. Memory 112 may include a test application 114 for execution on processor 120 to control and evaluate testing of microprocessor 140. Memory 112 may also include test data 116, which may include an initial processor state and a predicted processor state, as well as instructions and data to be executed and acted on by microprocessor 140. Test computer 110 also includes a communications port 124 for communicating with an external service processor 130 and user interface 126. User interface may, for example, include the traditional display screen, keyboard, and mouse. Although test computer 110 may be a stand-alone general purpose computer workstation as described above, it should be recognized that other computer systems offering similar or enhanced functionality, such as a shared resource, networked, or distributed computer system, may be used instead.

Service processor 130 interfaces with microprocessor 140 to upload and download one or more states to and from microprocessor 140. Techniques including the use of internal scan chains, well known in the field of microprocessor and integrated circuit testing, may be used to upload and download processor states. Service processor 130 can also initialize memory 135 which is accessed by microprocessor 140 during a test cycle. Memory 135 may contain, for example, instructions for execution by microprocessor 140 and data to be processed by microprocessor 140. In addition, service processor 130 is able to read and write to control and status registers (CSR) 148 as well as other externally-accessible registers such as unpark register 149.

Microprocessor 140 includes an interface region 142 at one or more edges of the processor and a core region 144. Interface region 142 and core region 144 may be designed to operate at different clock frequencies. In the exemplary embodiment, a system clock generates a first clock signal, which may be selected by multiplexer 138 and passed to phase locked loop multiplier 134 to produce a CPU_clock signal. An I/O clock generator meanwhile produces an I/O clock signal, which may be at a different frequency from the system clock signal, which is passed to PLL multiplier 136 to produce SBU_CLK clock signal. Thus, interface region 142 can operate at a first frequency defined by SBU_CLK and core region 144 can operate at a second frequency defined by CPU_CLK. In one mode of operation, e.g., a test mode, multiplexer 138 selects the I/O clock source for the system clock signal, which results in synchronized clock signals for the interface and core regions. Although synchronized, different multipliers can be applied by PLL multipliers 134, 136, so that clock signals CPU_CLK and SBU_CLK are synchronized, but may in fact not be identical. That is, the frequency of one of the clock signals CPU_CLK and SBU_CLK may be a multiple of the other, or both may be a multiple of the I/O clock frequency, and the value of each is determinable based on the timing of the other. In one embodiment, an SBU circuit 150, which is internal to microprocessor 140, receives clock signals CPU_CLK and SBU_CLK from PLL multipliers 134, 136.

Core region 144 contains one or more processing cores 146, each of which may include one or more execution pipelines, referred to herein as "strands." For example, Core regions 144 may include 8 processing cores each having four strands, for a total of 32 strands in microprocessor 140. Each strand can be booted, i.e., "unparked" independently by service processor 130 by asserting a signal to microprocessor 140, e.g., by writing to unpark register 149, to change a bit value.

Although SBU circuit 150 is shown once in microprocessor 140, it may be repeated many times. For example, one SBU circuit 150 may be implemented for each unpark signal to each strand.

Figure 2:
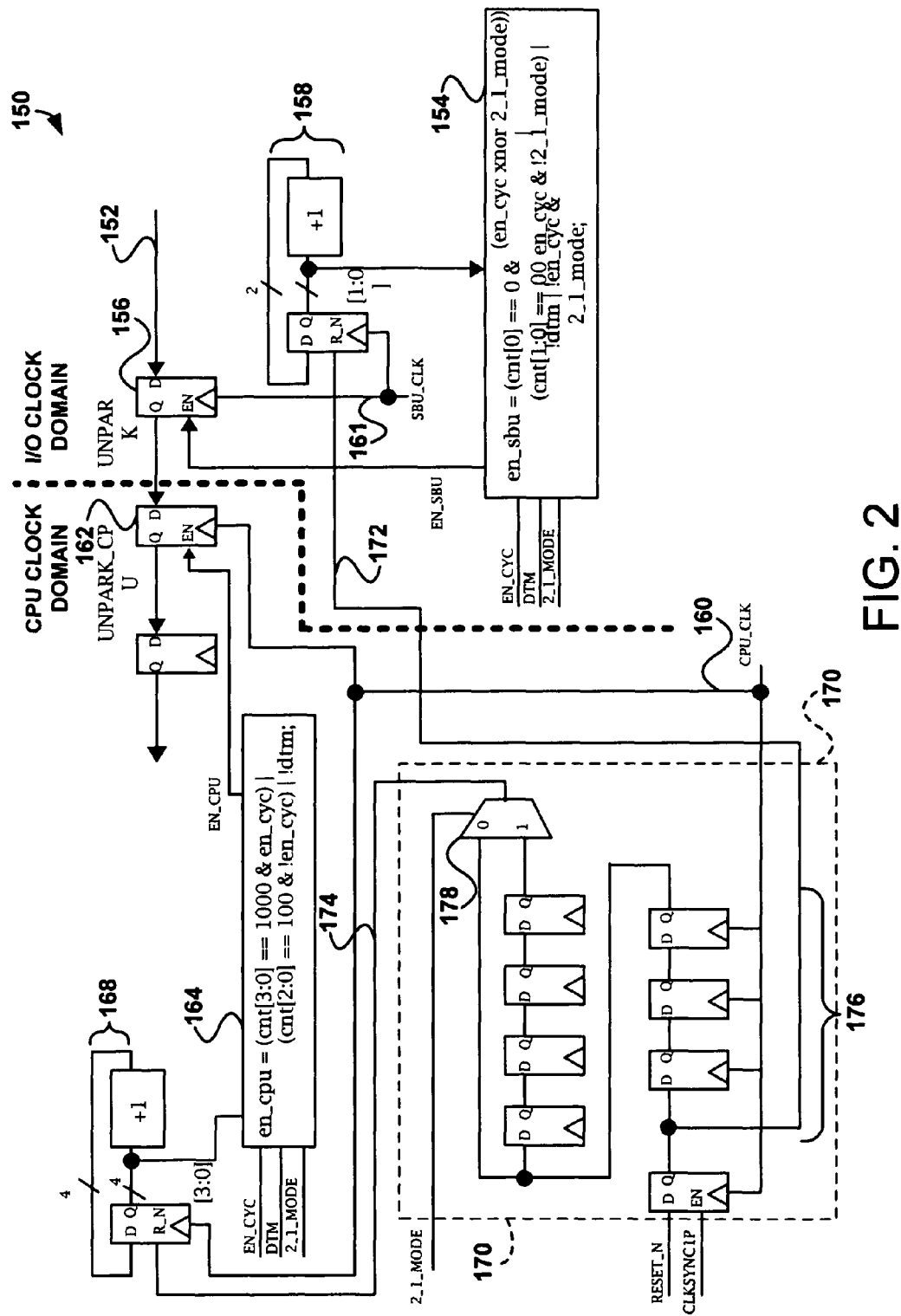
FIG. 2 shows by way of example a circuit for providing a deterministic unpark signal for use with the testing system of FIG. 1.

FIG. 2 shows by way of example SBU circuit 150. Operation of SBU circuit 150 will be described in conjunction with FIG. 3 which presents a timing diagram 200. The linked timing signals allow test computer 110 and service processor 130 to start and stop microprocessor 140 in a deterministic manner, allowing the ending state to be predictable based on a determined number of I/O clock cycles and CPU clock cycles.

Figure 3:
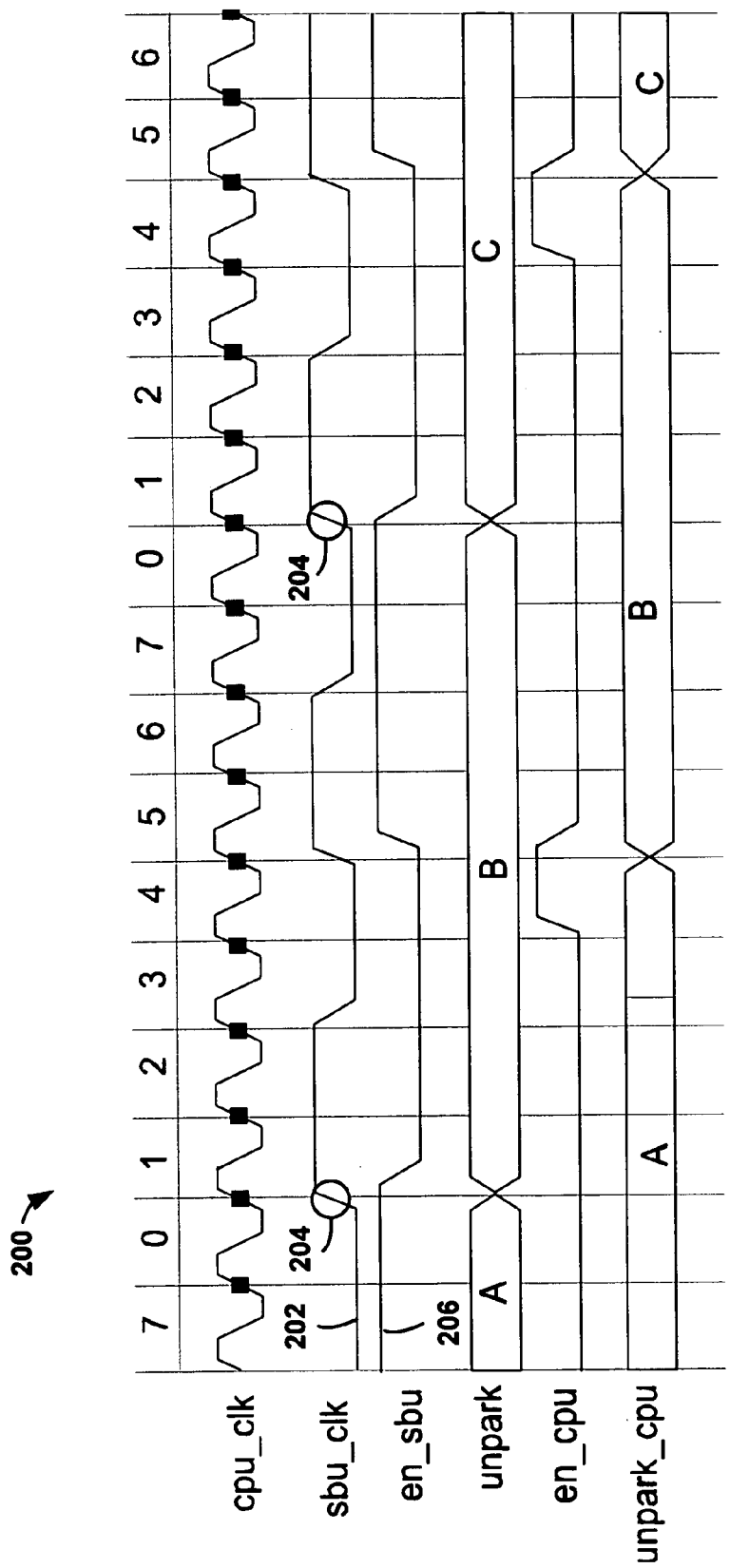
FIG. 3 shows a timing diagram which assists in explaining the operation of the circuit of FIG. 2.

SBU circuit 150 provides a mechanism to generate a deterministic strand unpark signal and using synchronized CPU and I/O clock signals. A first flip-flop 156 receives input data signal 152, SBU clock input, and enable signal en_sbu generated from block 154. Input data signal 152 may, e.g., originate at one of the bits of unpark register 149 shown in FIG. 1. Enable signal en_sbu is generated based on input from counter 158 which is driven by SBU_CLK signal 161. As indicated in FIG. 3, en_sbu provides a signal 206 having a frequency of one-half the frequency of the SBU clock signal 204. First flip-flop 156 produces signal UNPARK when SBU clock signal 202 has an uprising edge 204 that coincides with a high en_sbu signal 206. Depending on values EN_CYC, DTM, and 2_1_MODE, which may, for example, be stored in CSR 148 (FIG. 1), en_sbu one-half or one-fourth, in conjunction with output from counter 158.

Signal UNPARK crosses from the I/O clock domain to the CPU clock domain and enters a second flip-flop 162 which outputs signal unpark_cpu in the CPU clock domain. Second flip-flop 162 receives the CPU clock signal 160 and an enable signal en_cpu from block 164. Block 164 operates in a manner similar to block 154, but receives a four-bit counter 168 instead of a two-bit counter. Enable signal en_cpu is injected into second flip-flop 162 which generates the signal unpark_cpu. Counter-reset circuit block 170 generates reset signals 172, 174 for flip-flops 156, 162 respectively. By using a single counter-reset circuit block 170, synchronicity of the first and second counters is assured. Delay flip-flops 176 provide a delay of the reset timing to ensure that the respective signals arrive at the appropriate time. When signal 2_2_1_MODE is asserted, additional delay is selected by multiplexer 178 to account for the change in frequency of the enable signals.

Figure 4:
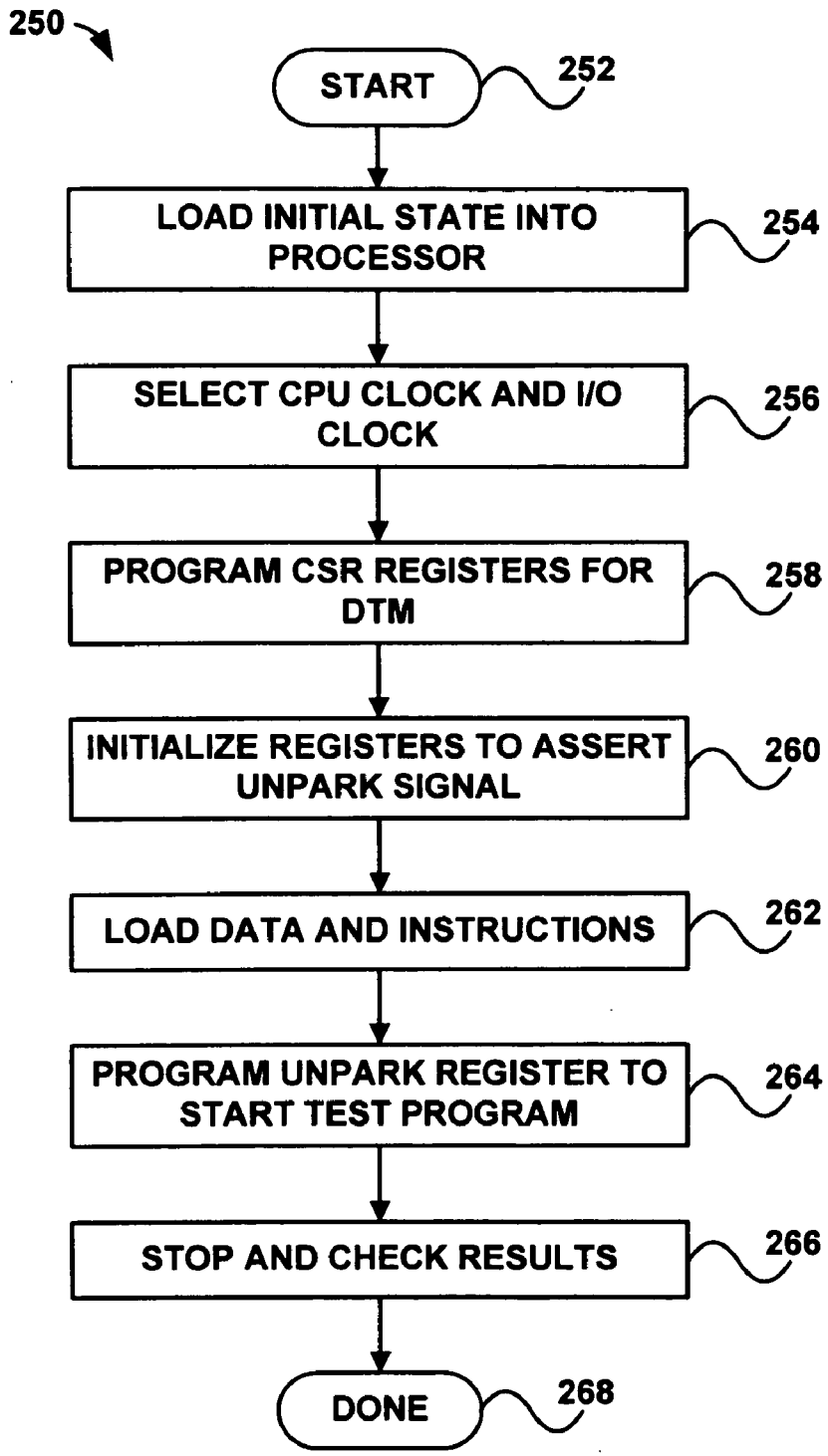
FIG. 4 shows flowchart representing by way of example a method of using microprocessor testing system of FIGS. 1 and 2.

FIG. 4 shows flowchart 250 representing by way of example a method of using microprocessor testing system 100 and SBU circuit 150. The procedure begins as indicated by starting block 252 and flows to operation 254, wherein the initial state is loaded into microprocessor 140. As mentioned previously, the initial state can be stored in general purpose computer 110 and loaded into microprocessor 140 by way of service processor 130 and internal scan-chains, which are implemented in the known manner After loading the initial state into the microprocessor, the procedure flows to operation 256, wherein the CPU and I/O clock speeds are selected. Referring to FIG. 1, I/O clock 139 may be selected as the source for both the CPU clock signals and the I/O clock signals although one or both clock signals may be multiplied for testing purposes. As shown in FIG. 3, CPU clock signal cpu_clk has four times the frequency of sbu_clk, which is the I/O clock signal.

After selecting CPU and I/O clocks, the procedure flows to operation 258 wherein the CSR 148 are programmed. CSR 148, shown in FIG. 1, may be programmed via service processor 130. In one embodiment, each signal, including CLOCKSYNC1P, EN_CYC, DTM, and 2_1_MODE correspond to one bit in a single register in CSR 148. Therefore, programming CSR 148 for SBU circuit 150 may entail simply setting a single register.

After setting CSR 148, the procedure flows to operation 260 wherein registers are initialized for asserting the unpark signal. In various embodiments, there may be a plurality of registers internal to microprocessor 140 that must be set in a predetermined sequence for unparking a strand. The registers to be set will vary depending on the particular microprocessor 140, the design of which will dictate the required initialization registers and values to be set therein.

In operation 262, data and instructions are loaded into memory 135. The data and instructions are operated on or executed by microprocessor 140 during the test. In operation 264, an unpark register is finally programmed into microprocessor 140, which causes microprocessor 140 to boot and execute instructions in memory 135.

After a predetermined number of clock cycles, microprocessor 140 is stopped, and the state is unloaded and compared with the predicted state. The procedure then ends as indicated by done block 266.

It should be recognized that, although the procedure outlined above with reference to FIG. 4 shows a series of operations in a particular order, other orders as would occur to those skilled in the art having benefit of the present disclosure could be implemented. For example, operations 254 through 262 could be performed in any order. Furthermore, some operations can be performed concurrently with other operations.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated. Further, the manipulations performed are often referred to in terms such as producing, identifying, determining, or comparing.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion. In addition, the invention may be encoded in an electromagnetic carrier wave in which the computer code is embodied.

Embodiments of the present invention can be processed on a single computer, or using multiple computers or computer components which are interconnected. A computer, as used herein, shall include a standalone computer system having its own processor(s), its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A circuit for deterministic unparking of a strand of a microprocessor having multiple clock domains, the circuit comprising:
    a first flip-flop having a data input connected to receive a first unpark signal, a first clock signal, and a first enable signal;
    a first logic block configured to generate the first enable signal, the first logic block including a first counter, the first enable signal being asserted based on the first counter at a frequency less than a frequency of the first clock signal;
    a second flip-flop having a data input connected to an output of the first flip-flop, the second flip-flop connected to receive a second clock signal and a second enable signal, the second clock signal being in a different clock domain of the microprocessor than the first clock signal, the second flip-flop generating a second unpark signal; and
    a second logic block configured to generate the second enable signal, the second logic block including a second counter, the second enable signal being asserted based on the second counter at a frequency less than the second clock signal; and wherein
    the second unpark signal is used to unpark a strand of the microprocessor in a deterministic manner.

2. The circuit of claim 1, wherein the first logic block is responsive to a mode input signal, the mode input signal causing the first enable signal to be asserted at one of a first frequency or a second frequency depending on a value of the mode input signal.

3. The circuit of claim 1, wherein the first counter is a two-bit counter.

4. The circuit of claim 1, wherein the second logic block is responsive to a mode input signal, the mode input signal causing the second enable signal to be asserted at one of a first frequency or a second frequency depending on a value of the mode input signal.

5. The circuit of claim 1, further comprising:
a counter reset signal generator circuit block configured to generate a first counter reset signal and a second counter reset signal, the counter reset signal generator circuit block including a plurality of delay flip-flops for delaying a reset signal to one of the first counter or the second counter.

6. The circuit of claim 5, wherein the counter reset signal generator circuit block further comprises a multiplexer for selectively including at least one additional delay flip-flop in a signal path of one of the first and second reset signals.

7. The circuit of claim 1, wherein the first counter is a two-bit counter and the second counter is a four-bit counter.

8. A microprocessor configured for deterministic unparking of a strand of the microprocessor, the microprocessor comprising:
an interface region controlled by a first clock having a first frequency;
a core region controlled by a second clock having a second frequency;
a circuit for generating a deterministic unpark signal, the circuit comprising:
a first flip-flop having a data input connected to receive a first unpark signal, a first clock signal form the first clock, and a first enable signal;
a first logic block configured to generate the first enable signal, the first logic block including a first counter, the first enable signal being asserted based on the counter at a frequency less than the first frequency;
a second flip-flop having a data input connected to an output of the first flip-flop, the second flip-flop connected to receive a second clock signal from the second clock and a second enable signal, the second flip-flop generating a second unpark signal; and
a second logic block configured to generate the second enable signal, the second logic block including a second counter, the second enable signal being asserted based on the second counter at a frequency less than the second clock signal; and wherein
the second unpark signal is used to unpark the strand of the microprocessor in a deterministic manner.

9. The microprocessor of claim 8, wherein the first logic block is responsive to a mode input signal, the mode input signal causing the first enable signal to be asserted at one of a first frequency or a second frequency depending on a value of the mode input signal.

10. The microprocessor of claim 8, wherein the first counter is a two-bit counter.

11. The microprocessor of claim 8, wherein the second logic block is responsive to a mode input signal, the mode input signal causing the second enable signal to be asserted at one of a first frequency or a second frequency depending on a value of the mode input signal.

12. The microprocessor of claim 8, further comprising:
a counter reset signal generator circuit block configured to generate a first counter reset signal and a second counter reset signal, the counter reset signal generator circuit block including a plurality of delay flip-flops for delaying a reset signal to one of the first counter or the second counter.

13. The microprocessor of claim 12, wherein the counter reset signal generator circuit block further comprises a multiplexer for selectively including at least one additional delay flip-flop in a signal path of one of the first and second reset signals.

14. The microprocessor of claim 8, wherein the first counter is a two-bit counter and the second counter is a four-bit counter.

15. A method for testing a microprocessor having a CPU clock domain and an I/O clock domain, the method comprising:
loading an initial state into the microprocessor;
selecting a CPU clock and an I/O clock so that signals generated therefrom have a rising edge that is synchronized, the CPU clock and the I/O clock each having a frequency that is an integer multiple of the other of the CPU clock and the I/O clock, the integer multiple being equal to at least one;
programming control and status registers for a deterministic mode of operation of the microprocessor;
initializing registers required to assert an unpark signal;
load data and instructions into memory coupled to the microprocessor, the instructions comprising a test program;
programming an unpark register to start the test program;
allowing the microprocessor to run for a predetermined number of cycles; and
stopping the microprocessor and comparing an ending state of the microprocessor to an expected ending state.

16. The method of claim 15, further comprising:
receiving a signal generated by the unpark register at a data input of a first flip-flop, the first flip-flop being connected to receive an I/O clock signal from an I/O clock, and a first enable signal, the first enable signal being generated by a first logic block, the first logic block including a first counter, the first enable signal being asserted based on the counter at a frequency less than a frequency of the I/O clock signal;
outputting a first unpark signal from the first flip-flip;
receiving the first unpark signal from the first flip-flop at a data input of a second flip-flop, the second flip-flop being connected to receive a CPU clock signal from a CPU clock and a second enable signal, the second enable signal being generated by a second logic block, the second logic block including a second counter, the second enable signal being asserted based on the second counter at a frequency less than the CPU clock signal;
outputting a second unpark signal from the second flip-flop; and
unparking a strand of the microprocessor in response to the second unpark signal.

17. The method of claim 16, wherein at least one of the first logic block and the second logic block is responsive to a mode input signal, the mode input signal causing the first enable signal to be asserted at one of a first frequency or a second frequency depending on a value of the mode input signal.

18. The method of claim 16, further comprising:
generating a first counter reset signal a second counter reset signal;
delaying at least one of the first counter reset signal and the second counter reset signal by passing the at least one of the first counter reset signal and the second counter reset signal through a plurality of delay flip-flops; and
passing the first counter reset signal to the first counter and the second counter reset signal to the second counter.

19. The method of claim 18, wherein the delaying comprises selectively passing at least one additional delay flip-flop in a signal path of one of the first and second reset signals.

20. The method of claim 16, wherein the first counter is a two-bit counter and the second counter is a four-bit counter.

* * * * *